Oct. 2, 1956 G. L. HOLLANDER 2,765,456

ADDRESSING SYSTEM FOR DATA RECORDS

Filed Dec. 22, 1954

INVENTOR.
GERHARD L. HOLLANDER
BY
William J. Flynn
ATTORNEY 2,765,456
Patented Oct. 2, 1956

2,765,456

ADDRESSING SYSTEM FOR DATA RECORDS

Gerhard L. Hollander, Cleveland Heights, Ohio, assignor to Clevite Corporation, Cleveland, Ohio, a corporation of Ohio Application December 22, 1954, Serial No. 476,895

10 Claims. (Cl. 340—174)

Figure 1:
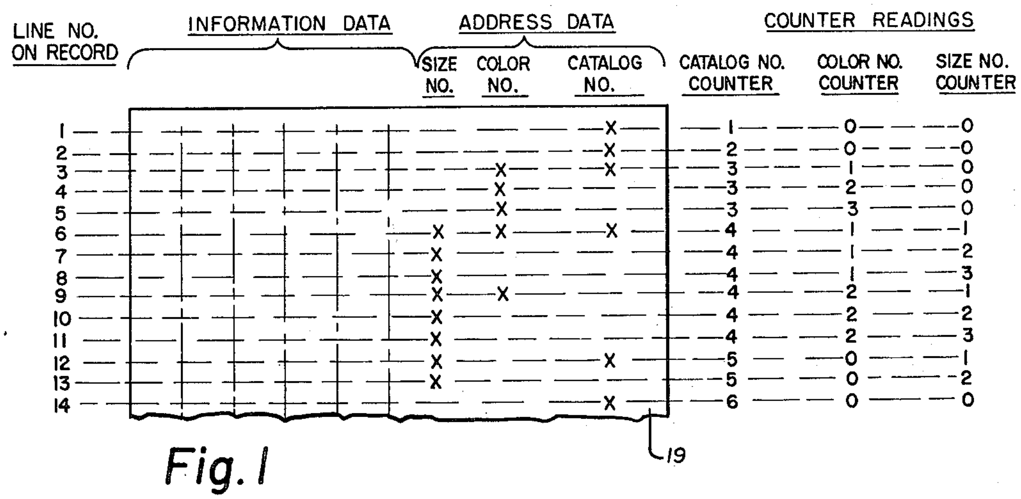

This invention relates to an addressing system for data records.

In storing data on a record, a generally used technique is to provide a separate "line" on the record for each item and to record the information data about that item on that "line" in several columns arranged side-by-side across the record. For example, on an inventory control record for a mail order house there might be separate columns for the number of items in stock, the number sold, the number on order, etc., all such inventory information for any particular item being recorded on one "line" of the record. (This "line" may be a straight line across the record or any pattern of locations across the record corresponding to the relative positions of the reading devices for the different data columns on the record.) In order to determine the status of any item, or to change a data entry for such item, it is necessary to locate the "line" on the record on which the information data for that item are recorded.

Generally, in such inventory controls the nature of the business is such that a mixed numbering system is used to catalog the various items, since the items themselves do not follow a regular pattern. Naturally, with such a mixed numbering catalog system to begin with, it would be advantageous to employ a system for addressing the items on the record which is compatible with this mixed numbering catalog system.

Heretofore, two general addressing techniques have been adopted in magnetic recording data storage equipment employing parallel readout.

In one, the complete address of the item, such as catalog number, size number and color number, will have been recorded in separate columns on the magnetic record medium adjacent the information data columns for that item. Comparison devices are connected to magnetic reproducer heads which are in playback relation to these address columns on the record medium. These comparison devices are pre-set in accordance with the address of the particular item which it is desired to locate on the record medium and are actuated only when that address comes into registration with the playback heads. Addressing systems of this type are relatively expensive and require an undue amount of space on the record medium which otherwise could be used for storing information data.

In a second addressing technique there is provided a "clock-track" column of regularly spaced synchronizing pulses along the record medium in the direction of the latter's movement, one synchronizing pulse for each individual inventory item recorded. The magnetic playback head which overlies this "clock-track" is connected to a counter which counts the recorded synchronizing pulses as the record medium moves past the playback head, so that this counter gives a numerical indication of each "line" on the record medium. With a "clock-track" addressing system very little space on the record is used for addressing the various items. However, where a mixed number catalog system is involved the "clock-track" addressing system is not directly compatible and it is necessary to provide conversion devices for converting the mixed number catalog designations into the consecutive numbers used to designate the items on the record, and vice versa. In practice this necessity of converting from one numbering system to another leads to serious inconvenience in making use of the recorded information.

The present invention is directed to a novel addressing system for data records which avoids the disadvantages of previous systems for this purpose and which is particularly adapted for use with a mixed numbering catalog system.

Accordingly, it is an object of the present invention to provide a novel and improved addressing system for data records.

Another object of the present invention is to provide a novel addressing system for data records which is particularly adapted for use with a mixed numbering system of designating the items about which data are to be recorded.

A further object of this invention is to provide a novel addressing system for data records which requires relatively little space on the record for addressing and which does not require an auxiliary consecutive numbering system for addressing on the record.

A still further object of this invention is to provide a novel addressing system for data records which facilitates totaling up the recorded information data in any particular category.

Other and further objects and advantages of this invention will be apparent from the following description of one practical embodiment thereof, illustrated in the accompanying drawing.

Figure 2:
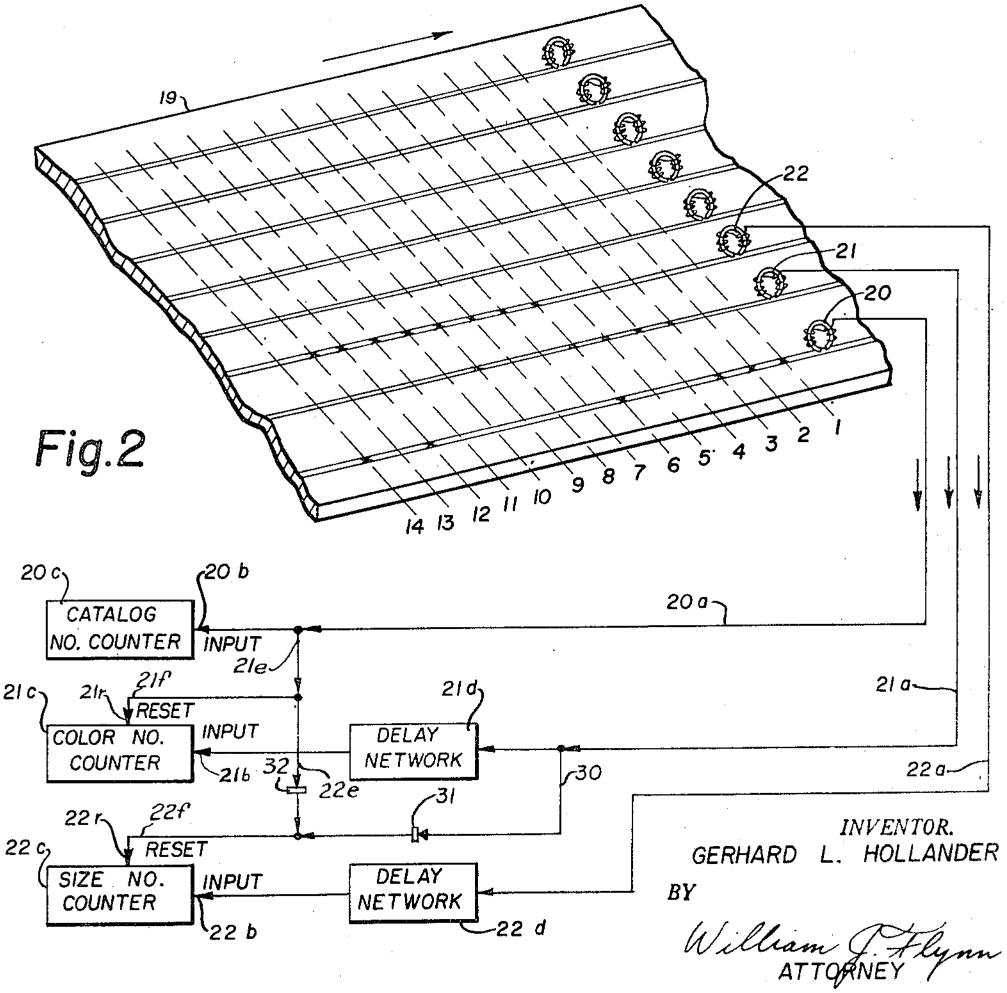

In the drawing:

Figure 1 shows a record having the address data recorded on successive "lines" and the readings of the counters for the respective address columns on the record, in accordance with one embodiment of the present system; and Figure 2 is a schematic diagram of an addressing system for data records according to the present invention.

Referring to Fig. 1, as an illustration of the way in which the present system might be applied to an inventory control for a mail order house or department store, assume that the product for sale is categorized in terms of catalog number, color number and size number. In most instances some such multiple, mixed numbering classification will be necessary since it would be impractical to provide a separate catalog number for each variation in size and color of a particular product, such as men's shirts. The present system is designed to fit into whatever classification the user will have previously adopted for business purposes.

In the illustrated example, the product of catalog number 1 has only one color and size, so that this product is completely identified by its catalog number only. The same applies to the product of catalog number 2. The product of catalog number 3 has three different colors and no size variations, so that the different species of this product are identified by the designations "catalog number 3, color number 1," "catalog number 3, color number 2" and "catalog number 3, color number 3," respectively. The product of catalog number 4 has two colors and three sizes in each color, so that six different items on the record, corresponding to the possible combinations of color and size for this product, are necessary.

In the present system, the various categories of classification, namely, catalog number, color number and size number in this instance, are arranged in an order of precedence. This order of precedence will correspond to the usual business practices of the user. Thus, in this instance the main classification, which is "catalog number," is chosen to have the highest precedence. The next most important category, which for purpose of this discussion is "color number," has the next highest precedence. The lowest order of precedence is assigned to "size number."

The magnetic record medium 19 is provided with separate columns or tracks for each of the address categories (catalog number, color number and size number), as well as separate columns or tracks on which the information data for each inventory item are recorded.

The product of catalog number 1 is addressed on the record medium by recording a pulse in the "catalog number" track on line 1 on the record medium. The various information data for this product are recorded on this line by pulses in the appropriate "information data" tracks.

The product of catalog number 2 is addressed on the record medium by recording a pulse on line 2 in the "catalog number" track on the record medium. The information data for this product are recorded on this line by pulses in the appropriate tracks.

For the product of catalog number 3 there are three different colors, for which separate inventory must be kept. Therefore, these species of this product are recorded as separate items on successive lines of the record medium. The item of catalog number 3, color number 1 is addressed on line 3 of the record medium by a pulse in the "catalog number" track and a pulse in the "color number" track, and the information data for this inventory item are recorded in the appropriate "information data" tracks on the same line. The item of catalog number 3, color number 2 is addressed on line 4 of the record medium by a pulse in the "color number" track. No pulse is recorded in the "catalog number" track because the catalog number for this item is the same as for the preceding item. Similarly the next item, catalog number 3, color number 3, is addressed by recording a pulse in the "color number" track only on the next line on the record medium, since the color number for this item is different from that of the preceding item, but the catalog number is the same.

The product of catalog number 4 has two different colors in three sizes, so that six separate items are recorded on successive lines on the record medium in order to keep a separate inventory for each such item. The inventory item of catalog number 4, color number 1, size number 1 is addressed by a pulse in the "catalog number" track, a pulse in the "color number" track, and a pulse in the "size number" track on line 6 on the record medium. The next inventory item, which is catalog number 4, color number 1, size number 2, is addessed on line 7 of the record medium by recording a pulse in the "size number" track only, since this is the only category for which the number designation has changed, the catalog number and color number being the same as for the immediately preceding inventory item. The next inventory item, which is catalog number 4, color number 1, size number 3 is addressed by recording a pulse in the "size number "track on line 8, no pulses being recorded on this line in the "catalog number" and "color number" tracks because these are the same as for the preceding inventory item. The next inventory item, which is catalog number 4, color number 2, size number 1, is addressed on the record medium by recording pulses in the "color number" and "size number" tracks on line 9, both of these being different from the preceding inventory item.

The addressing of the succeeding inventory items is carried out in the same manner, with a pulse being recorded in a particular address track only if the number designation in this category for the item in question is different from that for the preceding inventory item. The various information data for each inventory item are recorded on the same line as the address in any suitable manner.

Having addressed each inventory item on the magnetic record medium, as described, and having recorded the information data for each inventory item on the same record, suppose that now it is desired to locate a particular inventory item on the record so as to read off the information data for that item, or change the information data to bring it up to date, or for some other purpose. This is done in accordance with the present invention by fixedly positioning a plurality of magnetic reproducer heads in playback relation to the various tracks on the record medium. The pattern formed by the respective positions of the reproducer heads corresponds to the "line" across the record medium on which the address signals and information data for any particular item are recorded.

Referring to Fig. 2, the playback head 20 which overlies the "catalog number" track on the record medium 19 is connected through a line 20*a* to the input terminal 20*b* of a counter 20*c* of conventional design, so that as a recorded pulse on the "catalog number" track passes under the head 20 during the movement of the record medium past the assembly of heads an input pulse is supplied to the counter 20*c*, which registers the number of input pulses fed in. Similarly, the playback head 21, which overlies the "color number" track on the record medium, is connected through a line 21*a* and delay network 21*d* to the input terminal 21*b* of a counter 21*c*, so that each recorded pulse on this track produces an input pulse to this counter during the movement of the record medium past the heads. Likewise, the head 22 which overlies the "size number" track on the record medium delivers an input pulse through line 22*a* and delay network 22*d* to the input terminal 22*b* of a counter 22*c* as each recorded pulse on this track moves past this head in the movement of the record medium.

In accordance with the present invention the counters for the tracks of lower precedence are controlled by the heads for each of the higher precedence tracks, such that each of the lower precedence counters is reset to zero in response to each pulse from any head for a higher precedence track before a counting pulse recorded on the same line in the corresponding lower precedence track operates that particular counter. To this end, line 20*a*, which leads from the playback head 20 for the highest precedence track (which in this instance is the "catalog number" track) is connected, by way of lines 21*e* and 21*f*, to the reset terminal 21*r* of the "color number" counter 21*c* and is also connected, by way of lines 21*e*, 22*e*, and 22*f*, to the reset terminal 22*r* of the "size number" counter 22*c*. The line 21*a*, which leads from the playback head 21 for the track of next highest precedence (the "color number" track in this example) is connected also, through lines 30 and 22*f*, to the reset terminal 22*r* for the "size number" counter, which is of lower precedence. A directional network arrangement, such as a diode 31, is provided in line 30 to prevent a pulse from reproducer head 20 from passing through lines 20*a*, 21*e*, 22*e* and 30 and the delay network 21*d* to the input terminal of counter 21*c*, which would introduce a false count into this counter.

Likewise, line 22*e* is provided with a directional circuit element, such as diode 32, to prevent a pulse in line 30 from passing to the input terminal 20*b* of the catalog number counter 20*c* or to the reset terminal 21*r* of the color number counter 21*c*.

As the record medium moves past the several heads, every time a recorded pulse on the "catalog number" track is reproduced to actuate the "catalog number" counter, it also delivers reset pulses which resets the "color number" and "size number" counters to zero. Also, every time a recorded pulse on the "color number" track is played back to actuate the "color number" counter, it also delivers a reset pulse which resets the "size number" counter to zero. When a reset pulse is delivered to a lower precedence counter, that counter, due to the delay network ahead of its input terminal, is reset to zero before receiving an input pulse from its track on the same line.

It will be noted that this arrangement of the heads and counters in a predetermined order of precedence, such that a playback head for a higher precedence channel delivers a reset pulse to the counters for the lower precedence tracks, is corelated with the particular pulse recording technique used in addressing the inventory items. That is, the proper operation of the playback circuit depends upon the addresses having been recorded in the manner described in detail above, with a record pulse having been recorded in a particular address track for any given inventory item only when the number for that address category is different from that for the preceding inventory item.

In the operation of the above-described example, all of the counters are set to "zero" just before line 1 on the record medium passes under the heads.

When line 1 passes under the heads the recorded pulse in the "catalog number" track is played back as an input pulse to the "catalog number" counter 20*c*, causing this counter to register "1."

When line 2 on the record medium passes under the heads the recorded pulse in the "catalog number" track is played back as an input pulse to the "catalog number" counter 20c, causing this counter to register "2."

When line 3 on the record medium passes under the playback heads the recorded pulse in the "catalog number" track is played back as an input pulse to the "catalog number" counter 20*c*, causing this counter to register "3," and the recorded pulse in the "color number" track on this line is played back as an input pulse to the "color number" counter 21*c*, causing this counter to register "1."

As lines 4 and 5 on the record medium pass under the playback heads in succession the recorded pulses in the "color number" track are played back as input pulses to the "color number" counter 21*c*, which registers "2" and "3" in succession while the "catalog number" counter 20*c* continues to register "3."

When line 6 on the record medium passes under the playback heads the recorded pulse in the "catalog number" track is played back as an input pulse to the "catalog number" counter 20*c*, causing the latter to register "4," and as a reset pulse to the "color number" counter 21*c* to reset this counter to zero. Also on this line the recorded pulse in the "color number" track is played back as an input pulse through the delay network 21*d* to the "color number" counter 21*c*. Due to the time delay caused by the delay network 21*d* this input pulse is delivered to the "color number" counter shortly after the latter has been reset to zero by the reset pulse from the "catalog number" channel, so that this input pulse to the "color number" counter causes it to register "1." The recorded pulse in the "size number" track on line 6 is played back as an input pulse to the "size number" counter 22*c*, causing the latter to register "1."

As lines 7 and 8 on the record medium move past the playback heads the recorded pulses in the "size number" track are played back as input pulses to the "size number" counter 22*c*, causing this counter to register "2" and "3" in succession.

As line 9 on the record medium moves past the playback heads the recorded pulse in the "color number" track is played back as an input pulse to the "color number" counter 21*c*, causing this counter to register "2," and as a reset pulse to the "size number" counter 22*c* which resets the latter to zero. The recorded pulse in the "size number" track on line 9 is played back, after a time delay in the delay network 22*d* which permits the resetting of the "size number" counter to take place first, as an input pulse to the "size number" counter, causing the latter to register "1."

As lines 10 and 11 on the record medium move past the playback heads the successive recorded pulses in the "size number" track are played back as input pulses to the "size number" counter 22*c*, causing this counter to register "2" and "3," successively.

As line 12 on the record medium moves past the playback heads the recorded pulse in the "catalog number" track is reproduced as an input pulse to the "catalog number" counter 20*c*, causing this counter to register "5," as a reset pulse to the "color number" counter 21*c* which resets this counter to zero, and as a reset pulse to the "size number" counter 22*c* which resets this counter to zero. The recorded pulse on this line in the "size number" track is reproduced and delivered as an input pulse to the "size number" counter 22*c* slightly after this counter has been reset to zero, so that this input pulse causes the "size number" counter to register "1."

From the foregoing simplified example of an inventory control to which the present system may be applied the advantageous operation of the present invention should be apparent. Obviously, the present addressing system is adapted to various other data storage applications, such as payroll data for an employer, a passenger ticket inventory control for airlines or railroads, and various other industrial and commercial operations.

In some instances the width of the record medium will not be sufficient to provide enough separate signal tracks to accommodate all of the information data it is desired to record for each item of inventory. In that case, the present invention lends itself readily to a system in which the information data for any one inventory item are recorded in the information data tracks on successive lines on the record medium. In that event, in addition to the other address data, there will be provided a "line number" track of lowest precedence whose function is to indicate which "line" of the information data for any particular inventory item is contiguous to the playback heads. This has the same effect as if that many more separate columns of information data were provided on the record medium since the recorded entries for a given inventory item on successive lines in any particular track will be identified separately.

From the foregoing it will be apparent that the present addressing system and method is particularly well adapted for use where the items are cataloged by a mixed number system, since the same mixed number system may be used to address the items on the record without any need for converting first to an auxiliary number system for addressing purposes.

It is to be understood that in the present invention the above-mentioned delay networks for the lower precedence counters may be eliminated by providing counters which operate first in response to the reset pulse when the reset pulse and a counting pulse are delivered simultaneously to its reset and input terminals. Or, the address track pulses could be arranged in staggered fashion such that the pulses in the higher precedence tracks are reproduced slightly ahead of the pulses on the same "line" in the lower precedence tracks, so that each reset pulse is delivered to a lower precedence counter slightly sooner than the counting pulse (on the same line) to that counter. Moreover, each of the lower precedence counters may be reset by a reset pulse delivered from any of the higher precedence counters, in response to operation of such higher precedence counter by an address pulse reproduced from the corresponding address signal track, rather than being connected directly to each of the higher precedence reproducer heads so as to be reset as described above.

Also, while the present invention has been described above in connection with a magnetic recording data storage equipment in which a magnetic record medium moves past a plurality of stationary heads, it may as readily be employed in a magnetic recording arrangement in which a plurality of heads are mounted to move past a stationary or relatively slowly moving magnetic record medium. For example, the present system and method may be employed to great advantage in the arrangement disclosed in the co-pending application of S. J. Begun, Serial No. 300,933, filed July 25, 1952, now U. S. Patent No. 2,722,676, which is assigned to the same assignee as the present invention. Furthermore, the present invention may be applied to magnetic recording/reproducing equipment having flux responsive heads and in which relative movement between the heads and the record medium is not necessary in order to reproduce the recorded signal information. Also, the present invention is adapted for use with various types of data storage equipment other than magnetic recording equipment, such as photographic or other visual recording equipment.

Accordingly, while there has been described above and illustrated in the accompanying drawing one embodiment of the present invention, it is to be understood that various modifications, omissions and refinements which depart from the disclosed embodiment may be adopted without departing from the spirit and scope of the present invention.

I claim:

1. In a data storage system, the combination of a record medium having information data recorded thereon and at least two address signal tracks thereon which have an order of precedence, signal reproducing devices in playback relation respectively to individual ones of said address signal tracks on the record medium for reproducing individually the recorded address signals thereon, counters connected individually to said signal reproducing devices for counting the successive recorded address signals on the corresponding tracks, and means for resetting to its starting count the counter for the lower order address signal track in response to a signal on the higher order address signal track.

2. In a data storage system, the combination of a record medium having a plurality of recorded information data tracks and a plurality of recorded address signal tracks thereon which have a predetermined order of precedence, said address signal tracks having discrete successive address signals recorded thereon in irregular sequence, signal reproducing devices in reproducing relation respectively to individual address signal tracks on the record medium for reproducing individually the successive recorded address signals, counters connected individually to said signal reproducing devices for counting the successive recorded address signals on the corresponding address signal tracks, and means for resetting to its starting count the counter for an address signal track of lower precedence in response to a signal reproduced by a reproducing device for a higher precedence address signal track.

3. In a data storage system for separate items of record, the combination of a record medium having a plurality of recorded information data tracks and a plurality of recorded address signal tracks in side-by-side relation thereon, a plurality of reproducing devices in reproducing relation individually to the information data and address signal tracks on the record medium, said record medium having information data for each item recorded in separate information data tracks on a line across the record medium corresponding to the relative positions of the corresponding reproducing devices, said address signal tracks having discrete successive address signals recorded thereon with an address signal recorded in an address signal track substantially on any particular line only if the address designation in that track for the item whose information data are recorded on that line is different from that for the preceding item, said address signal tracks having a predetermined order of precedence, a plurality of counters connected individually to the reproducing devices for the address signal tracks to count the successive recorded address signals in the corresponding tracks, and means for resetting to its starting count the counter for an address signal track of lower precedence in response to a signal on the same line in a higher precedence address signal track before an address signal on that line in the address signal track for that counter operates said counter.

4. In a data storage system for separate items of record, the combination of a record medium having a plurality of recorded information data tracks and a plurality of recorded address signal tracks in side-by-side relation thereon, a plurality of reproducing devices in reproducing relation individually to the information data and address signal tracks on the record medium, said record medium having information data for each item recorded in separate information data tracks on a line across the record medium corresponding to the relative positions of the corresponding reproducing devices, each of said address signal tracks having discrete successive address signals recorded thereon with an address signal recorded in an address signal track substantially on a particular line only if the address designation in that track for the item whose information data are recorded on that line is different from that for the preceding item, said address signal tracks having a predetermined order of precedence, a plurality of counters connected individually to the reproducing devices for the address signal tracks to count the successive recorded address signals on the corresponding address signal tracks, and connections from address signal reproducing devices to counters for address signal tracks of lower precedence for resetting to its starting count each said lower precedence counter in response to an address signal on the same line reproduced by a reproducing device for a higher precedence address signal track before an address signal on the same line in the address signal track for that counter operates said counter.

5. In a data storage system for separate items of record, the combination of a movable record medium having a plurality of recorded information data tracks and a plurality of recorded address signal tracks in side-by-side relation thereon, a plurality of reproducing devices in reproducing relation individually to the information data and address signal tracks on the record medium, said record medium having the information data for each item recorded in separate information data tracks on a line across the record medium corresponding to the relative positions of the corresponding reproducing devices, each of said address signal tracks having discrete successive address signals recorded thereon with an address signal recorded in an address signal track substantially on a particular line only if the address designation in that track for the item whose information data are recorded on that line is different from that for the preceding item, said address signal tracks having a predetermined order of precedence, a plurality of counters connected individually to the reproducing devices for the address signal tracks to count the successive recorded address signals on the corresponding address signal tracks as the record medium moves past the signal reproducing devices, and connections from the address signal reproducing devices for all but the lowest precedence address signal track to the respective counters for the address signal tracks of lower precedence for resetting to its starting count each said lower precedence counter in response to an address signal on the same line reproduced by a reproducing device for a higher precedence address signal track before an address signal on that line reproduced from the address signal track for that counter operates said counter.

6. In a data storage system, the combination of a magnetic record medium having information data magnetically recorded thereon and at least two address signal tracks thereon which have an order of precedence, magnetic reproducer heads in playback relation respectively to individual ones of said address signal tracks on the magnetic record medium for reproducing individually the magnetically recorded address signals thereon, counters connected individually to said reproducer heads for counting the successive recorded address signals on the corresponding address signal tracks, and means for resetting to its starting count the counter for the address signal track of lower precedence in response to a signal on the address signal track of higher precedence.

7. In a data storage system, the combination of a magnetic record medium having a plurality of recorded information data tracks and a plurality of recorded address signal tracks thereon which have a predetermined order of precedence, said address signal tracks having discrete address signal pulses magnetically recorded thereon in irregular sequence, magnetic reproducer heads in reproducing relation individually to the address signal tracks for reproducing individually the recorded address signal pulses, counters connected individually to said reproducer heads for counting the successive recorded address signal pulses on the corresponding record tracks, and means for resetting to its starting count the counter for an address signal track of lower precedence in response to an address signal pulse reproduced by a reproducer head for a higher precedence address signal track.

8. In a data storage system for separate items of record, the combination of a magnetic record medium having a plurality of recorded information data tracks and a plurality of recorded address signal tracks in side-by-side relation thereon, magnetic reproducer heads in playback relation individually to the information data and address signal tracks on the record medium, said record medium having information data for each item recorded magnetically in separate information data tracks on a line across the record medium corresponding to the relative positions of the corresponding reproducer heads, said address signal tracks having discrete address signal pulses recorded thereon with an address signal pulse recorded in an address signal track substantially on the line for any particular item only if the address designation in that track for that item is different from that for the preceding item, said address signal tracks having a predetermined order of precedence, counters connected individually to the reproducer heads for the address signal tracks to count the successive recorded address signal pulses on the corresponding tracks, and means for resetting to its starting count the counter for an address signal track of lower precedence in response to a signal pulse on the same line in a higher precedence address signal track before an address signal pulse on that line in the address signal track for that counter operates said counter.

9. In a data storage system for separate items of record, the combination of a magnetic record medium having a plurality of recorded information data tracks and a plurality of recorded address signal tracks in side-by-side relation thereon, a plurality of magnetic reproducer heads in reproducing relation individually to the information data and address signal tracks on the record medium, said record medium having the information data for each item recorded in separate information data tracks on a line across the record medium corresponding to the relative positions of the corresponding reproducer heads, each of said address signal tracks having discrete successive address signal pulses recorded thereon with an address signal pulse recorded in an address signal track substantially on the line for any particular item only if the address designation in that track for that item is different from that for the preceding item, said address signal tracks having a predetermined order of precedence, a plurality of counters connected individually to the reproducer heads for the address signal tracks to count the successive recorded address signal pulses on the corresponding address signal tracks, and connections from reproducer devices to counters for address signal tracks of lower precedence for resetting to its starting count each said lower precedence counter in response to an address signal pulse on the same line reproduced by a reproducer head for a higher precedence address signal track before an address signal pulse on that line reproduced from the address signal track for that counter operates said counter.

10. In a data storage system for separate items of record, the combination of a movable magnetic record medium having a plurality of recorded information data tracks and a plurality of magnetic reproducer heads in reproducing relation individually to the information data and address signal tracks on the record medium, said record medium having the information data for each item magnetically recorded in separate information data tracks on a line across the record medium corresponding to the relative positions of the corresponding reproducer heads, each of said address signal tracks having discrete successive address signal pulses magnetically recorded thereon with an address signal pulse recorded in an address signal track substantially on a particular line only if the address designation in that track for the item whose information data are recorded on that line is different from that for the preceding item, said address signal tracks having a predetermined order of precedence, a plurality of counters connected individually to the reproducer heads for the address signal tracks to count the successive recorded address signal pulses on the corresponding address signal tracks as the record medium moves past the reproducer heads, and connections from the reproducer heads for all but the lowest precedence address signal track to the respective counters for the address signal tracks of lower precedence for resetting to its starting count each said lower precedence counter in response to an address signal pulse on the same line reproduced by a reproducer head for a higher precedence address signal track before an address signal pulse on that line reproduced from the address signal track for that counter operates said counter.

References Cited in the file of this patent

UNITED STATES PATENTS 2,549,071 Dusek ---------------- Apr. 17, 1951
2,679,638 Benski ---------------- May 25, 1954